US010616120B2

(12) United States Patent
Starsinic et al.

(10) Patent No.: US 10,616,120 B2
(45) Date of Patent: *Apr. 7, 2020

(54) SERVICE LAYER SOUTHBOUND INTERFACE AND QUALITY OF SERVICE

(71) Applicant: Convida Wireless, LLC, Wilmington, DE (US)

(72) Inventors: Michael F. Starsinic, Newtown, PA (US); Dale N. Seed, Allentown, PA (US); Catalina M. Mladin, Hatboro, PA (US); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,046

(22) Filed: Mar. 23, 2017

(65) Prior Publication Data

US 2017/0195239 A1 Jul. 6, 2017

Related U.S. Application Data

(63) Continuation of application No. 14/341,343, filed on Jul. 25, 2014, now Pat. No. 9,621,470.
(Continued)

(51) Int. Cl.
*H04W 28/02* (2009.01)
*H04L 12/851* (2013.01)
(Continued)

(52) U.S. Cl.
CPC .......... *H04L 47/2441* (2013.01); *H04W 4/70* (2018.02); *H04W 28/02* (2013.01); *H04W 72/08* (2013.01)

(58) Field of Classification Search
None
See application file for complete search history.

(56) References Cited

U.S. PATENT DOCUMENTS

2008/0232376 A1 9/2008 Huang
2009/0245130 A1* 10/2009 Bing ................... H04L 43/0894
370/253
(Continued)

FOREIGN PATENT DOCUMENTS

JP 2012/533918 12/2012
JP 2016-531489 10/2016
(Continued)

OTHER PUBLICATIONS

3rd Generation Parnership Project (3GPP); Ericsson: "Quality of Service Control Rule Definition and Operations", 3GPP Draft; C3-080550 48 PCCQOS 03 GXX_QOSRULE_DEFI, Mobile Competenece centre; 650, Route Des Lucioles; May 2008.
(Continued)

*Primary Examiner* — Kodzovi Acolatse
(74) *Attorney, Agent, or Firm* — BakerHostetler

(57) ABSTRACT

Existing resource reservation techniques are inefficient for M2M communications. In an example embodiment described herein, a system comprises a service layer server that resides on a service layer and a control plane node that resides on an access network, wherein the service layer server communicates with the control plane node via a control plane interface. The control plane interface can be used to configure quality of service (QoS) policies (rules) that are based on an object that is being addressed. In this context, for example, an object may be a memory location or value. For example, the service layer may configure one or more QoS rules for the access network based on the object by sending a QoS provisioning message that includes one or more parameters to the control plane node. The control plane
(Continued)

node may determine the object that is identified in the one or more QoS rules, and the QoS rules may be distributed to one or more routers that may be used to access the object. The access network may apply the one or more QoS rules in accordance with the parameters.

15 Claims, 8 Drawing Sheets

Related U.S. Application Data

(60) Provisional application No. 61/858,386, filed on Jul. 25, 2013.

(51) Int. Cl.
*H04W 4/70* (2018.01)
*H04W 72/08* (2009.01)

(56) References Cited

U.S. PATENT DOCUMENTS

| | | | |
|---|---|---|---|
| 2010/0017846 A1 | 1/2010 | Huang | |
| 2012/0044867 A1* | 2/2012 | Faccin | H04W 60/00 370/328 |
| 2012/0246325 A1* | 9/2012 | Pancorbo Marcos | H04L 63/102 709/227 |
| 2012/0287854 A1 | 11/2012 | Xie | |
| 2013/0022042 A1* | 1/2013 | Vasseur | H04L 45/121 370/389 |
| 2013/0042011 A1 | 2/2013 | Sugizaki | |
| 2013/0155948 A1 | 6/2013 | Pinheiro | |
| 2013/0225122 A1 | 8/2013 | Kahn | |
| 2013/0265917 A1* | 10/2013 | Lv | H04W 24/02 370/310 |
| 2014/0153504 A1* | 6/2014 | Wang | H04W 28/14 370/329 |
| 2014/0160990 A1* | 6/2014 | Sachdev | H04W 24/02 370/259 |
| 2014/0269779 A1 | 9/2014 | Shan | |
| 2015/0016299 A1* | 1/2015 | Zhang | H04L 43/028 370/253 |
| 2015/0029854 A1 | 1/2015 | Starsinic et al. | |
| 2015/0195671 A1* | 7/2015 | Seed | H04L 67/16 455/434 |
| 2015/0195858 A1* | 7/2015 | Jin | H04L 41/5051 370/230 |
| 2015/0201342 A1 | 7/2015 | Vannithamby | |

FOREIGN PATENT DOCUMENTS

| | | |
|---|---|---|
| WO | WO 2011/006889 | 1/2011 |
| WO | WO 2011/129098 | 10/2011 |
| WO | 2012/063041 A1 | 5/2012 |
| WO | WO 2012/098779 | 7/2012 |
| WO | WO 2012/109531 | 8/2012 |
| WO | WO 2013/056365 | 4/2013 |
| WO | 2013/067183 A1 | 5/2013 |
| WO | WO 2013/066388 | 5/2013 |

OTHER PUBLICATIONS

International Patent Application No. PCT/US2014/048214: International Search Report and Written Opinion dated Feb. 5, 2015, 15 pages.
DiffServ, "The Scalable End-To-End Quality of Service Model", Cisco Systems, Aug. 2005, 19 pages, www.cisco.com/go/offices.
3rd Generation Partnership Project (3GPP); TS 29.368 v11.3.0, "3rd Generation Partnership Project; Technical Specification Group Core Network and Terminals; Tsp Interface Protocol Between the MTC Interworking Function (MTC-IWF) and Service Capability Server (SCS), (Release 11)"; Jun. 2013, 24 pages.
3rd Generation Partnership Project (3GPP); TS 23.382 v11.4.0, 3rd Generation Partnership Project; Technical Specification Group Services and System Aspects; Archtecture Enhancements to Facilitate Communications with Packet Data Networks and Applications, (Release 11) Jun. 2013, 29 pages.
3rd Generation Partnership Project (3GPP); TS 23.203 v12.1.0, "3rd Generation Partnership Project; Technical Specification Group Services and System Aspects; Policy and Charging Control Architecture (Release 12)"; Jun. 21, 2013, 189 pages.
3rd Generation Partnership Project (3 GPP); TS 23.401 V12.1.0, "3rd Generation Partnership Project; Technical Specification Group Services and System Aspects; General Packet Radio Service (GPRS) Enhancements for Evolved Universal Terrestrial Radio Access Network (E-UTRAN) access (Release 12)", Jun. 2013, 291 pages.
3rd Generation Partnership Project (3GPP); TR 21.905 V12.0.0, "3rd Generation Partnership Project; Technical Specification Group Services and System Aspects; Vocabulary for 3GPP Specifications (Release 12)", Jun. 2013, 64 pages.
3rd Generation Partnership Project (3GPP); TS 29.214 v12.0.0, "3rd Generation Partnership Project; Technical Specification Group Core Network and Terminals; Policy and Charging Control over Rx Reference Point, (Release 12)", Jun. 2013, 57 pages.
ETSI "Support for Qos", M2M(12)18_020, Ericsson, Meeting: M2M#18, Jan. 8, 2012, 7 pages.
OneM2M, "LS on Interaction of oneM2M with Underlying Networks", oneM2M Technical Plenary, TP-2013-0251R01, Apr. 19, 2013, 3 pages.
OneM2M "Requirements Technical Specification", oneM2M-TS-Requirements-V-0.0.2, Apr. 15, 2013, 16 pages.
3GPP TS 23.203 V12.0.0 "3rd Generation Partnership Project; Technical Specification Group Services and System Aspects; Policy and charging control architecture" (Release 12) Mar. 2013, 4 Pages.

\* cited by examiner

SERVICE LAYER SOUTHBOUND INTERFACE AND QUALITY OF SERVICE

CROSS REFERENCE TO RELATED APPLICATIONS

This Application is a continuation of U.S. patent application Ser. No. 14/341,343 filed Jul. 25, 2014 which claims the benefit of U.S. Provisional Patent Application Ser. No. 61/858,386 filed Jul. 25, 2013, the disclosures of which are hereby incorporated by reference as if set forth in their entirety herein.

BACKGROUND

Quality of service (QoS) generally refers to a data pipe, such as a general packet radio service (GPRS) tunnel protocol (GTP) tunnel for example, between two end points that provides a specific level (quality) of service. The level, or quality, of service may be defined by parameters such as, for example, maximum bit rate, delay, packet loss, or the like. Existing approaches to providing QoS include resource reservation and packet marking without resource reservation. Resource reservation in networks is traditionally used for internet protocol (IP) flows that are associated with streaming media such as video and audio for example. In an example communications network, such as a machine-to-machine (M2M) network or system, the number of M2M devices connected to the network may be several orders of magnitude greater than what is connected to typical broadband and mobile networks. The existing resource reservation techniques are inefficient for various communication networks, such as M2M systems for example.

SUMMARY

Systems, methods, and apparatus embodiments are described herein for configuring quality of service (QoS) rules by a service layer. Existing resource reservation techniques are inefficient for M2M communications. In an example embodiment described herein, a system comprises a service layer server that resides on a service layer and a control plane node that resides on an access network, wherein the service layer server communicates with the control plane node via a control plane interface. The control plane interface can be used to configure quality of service (QoS) policies (rules) that are based on an object that is being addressed. In this context, for example, an object may be a memory location, internet address, resource name, or value. For example, the service layer may configure one or more QoS rules for the access network based on the object by sending a QoS provisioning message that includes one or more parameters to the control plane node. The control plane node may determine the object that is identified in the one or more QoS rules, and the QoS rules may be distributed to one or more routers that may be used to access the object. The access network may apply the one or more QoS rules in accordance with the parameters.

In an example embodiment, an system comprising a service layer server that resides within a service layer and a control plane node that resides within an access network. The service layer server provisions a quality of service (QoS) rule via the control plane interface. The QoS rule is associated with an object such that the QoS rule is applied when the object is identified. The object can be at least one of an internet protocol (IP) address, port number, or resource name. The QoS rule may indicate various parameters. For example, the QoS associated with the object may indicate a route that a message associated with the object should be directed through the access network. In one embodiment, the service layer server is a services capability server, and the control plane node is a policy and charging rules function (PCRF). Further, the QoS rule may be provisioned directly from the services capability server to the PCRF over a diameter-based Rx interface. Alternatively, the QoS rule may be provisioned indirectly from the services capability server to the PCRF via a machine-type communications inter-working function.

In another example embodiment, a router in an access network may receive a message indicative of an object. The router may perform a deep packet inspection on the message. The router may identify the object indicated by the message during the deep packet inspection, and in response to identifying the object, a quality of service (QoS) rule may be applied to the message. The object may indicate a destination of the message. The destination may an internet protocol (IP) address, a port number, or a resource name. For example, the router may determine that the access network is in a congestion condition, and based on the congestion condition, the router may reject the message for a backoff time indicated in the QoS rule. By way of another example, the router may route the message through a preferred route of the access network, wherein the preferred route is indicated by the QoS rule.

DETAILED DESCRIPTION OF ILLUSTRATIVE EMBODIMENTS

The ensuing detailed description is provided to illustrate exemplary embodiments and is not intended to limit the scope, applicability, or configuration of the invention. Various changes may be made in the function and arrangement of elements and steps without departing from the spirit and scope of the invention.

Figure 1:
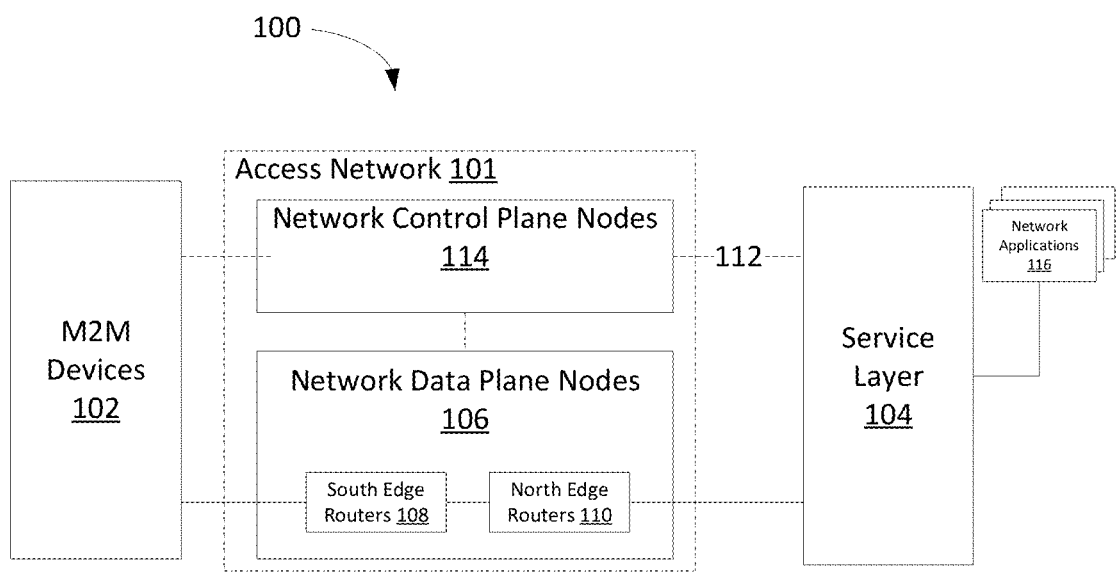
FIG. 1 is a block diagram of an example network architecture in accordance with an example embodiment.

Referring to FIG. 1, an example M2M system 100 includes a plurality of devices, such as a plurality of machine-to-machine (M2M) devices 102 for example, and a service layer 104 that can communicate with the M2M devices via an access network 101. As used herein, an M2M device may refer to any device that communicates in a network, such as gateway devices or terminal (endpoint devices) for example. Though the illustrated system 100 includes the M2M devices 102, it will be understood that other devices may communicate within the system 100 as desired. The M2M devices 102 can include M2M end point devices, routers, or the like. As one example, one or more of the M2M devices 102 may have the hardware architecture illustrated in FIG. 6C (described more fully below) or a variation thereof, or one or more the M2M devices 102 may have the architecture of the computing system illustrated in FIG. 6D (also described more fully below). The service layer 104 may include a service capability server (SCS), an M2M server, a one M2M server, or the like. Thus, the system 100, which can include the access network 101, can provide connectivity between the service layer 104, which may include an M2M server or an SCS, and one or more M2M devices 102. The service layer 104 may further provide services for, and thus communicate with, one or more applications, such as network applications 116. In accordance with the illustrated embodiment, the access network 101 includes one or more data plane nodes 106 that may route data traffic between the devices 102 and the service layer 104. The data plane nodes 106 that are closer in proximity to the devices 102 as compared to the service layer 104 may be referred to as south edge nodes, which can include one or more south edge routers 108 for example. The data plane nodes 106 that are closer in proximity to the service layer 104 as compared to the devices 102 may be referred to as north edge nodes, which can include one or more north edge routers 110 for example. Thus, the data plane nodes 106 can include south edge routers 108 and north edge routers 110. As one example, the routers 108 and 100 may have the configuration illustrated in FIG. 6C (described more fully below) or a variation thereof. In an example embodiment, the system 100 provides the service layer 104 with a control plane interface 112 that can be used by the service layer 104 to provide the access network 101 with quality of service (QoS) information, as further described below.

Still referring to FIG. 1, in accordance with the illustrated embodiment, the service layer 104 has the control plane interface 112 with the access network 101. The control plane interface can be used to configure quality of service (QoS) policies, such as QoS rules for example, that are based on an object that is being addressed. In this context, for example, an object may be a memory location, a value, an internet address, or a resource name. The access network 101 may include one or more control plane nodes 114 that may distribute the QoS rule(s) to select ones of the data plane nodes 106. The one or more control plane nodes 114 may also be referred to generally as the network control plane 114, and the one or more data plane nodes may also be referred to generally as the data plane 106. In accordance with an example embodiment, the control plane nodes 114 distribute an example QoS rule to only the data plane nodes 106 that may be used to access an object that is identified in the QoS rule. In some cases, as described further below, one or more of the data plane routers 108 and 110 may perform deep packet inspection (DPI) to recognize whether an object that was identified in a rule is being accessed. In an example embodiment, when one of the data plane routers 108 and 110 detects that a rule needs to be applied, a message is sent to the other data plane routers 108 and 110 in the network 101 to reserve resources for the traffic flow. As used herein, traffic flow is used interchangeably with other terms such as data flow, internet protocol flow, flow, or the like. Generally, a packet is characterized into a particular flow by its destination, for instance an IP address or port number for example. QoS rules may be applied to particular messages that are associated with a particular object. Alternatively, or additionally, QoS rules may be applied to entire traffic flows that include multiple messages that are associated with the object. For example, when an example flow ends, expires, or is modified, the data plane routers 108 and 110 may send notifications to each other to adjust the amount of resources that are reserved for the flow (e.g., see FIG. 4).

Still referring generally to FIG. 1, in accordance with another embodiment, the service layer 104 sends a Group QoS Provisioning message to the access network control plane (CP) node 114. The control plane node 114 may distribute one or more QoS rules to the data plane nodes 106 that may be used to access an object that is identified in the QoS rule. One or more of the data plane routers 108 and 110 may use deep packet inspection to determine that an object identified in a rule is being accessed. In some cases, the CP Node 114 checks whether the QoS rule or policy that is required by one of the devices 102 can be supported. By way of an example scenario, when determining how much, for instance an amount of, resources should be reserved for a data flow, the control plane node 114 may consider whether the device 102 is part of a group. For example, the control plane node 114 may determine data plane bearers that are not required by one of the devices 102 that is part of the group, and thus do not contribute to the aggregate bandwidth that is provided by the network 101 because the group has already reserved the maximum amount of allowed resources. Thus, in accordance with the example scenario above, a new group member may cause resources to be shared differently instead of causing an allotted amount of the resources to be increased. In some cases, one of the data plane routers 108 and 110 detects that a rule needs to be applied, a message may be sent to the other data plane routers 108 and 110 in the network 101 to reserve resources for a particular data flow. For example, when the data flow ends, expires, or is modified, the data plane routers 108 and 110 may send notifications to each other to adjust the amount of resources that are reserved for the particular flow (e.g., see FIG. 5).

As used herein, unless otherwise specified, the term object, and derivations thereof of such as the term object identity (ID) for example, refers to an addressable resource, container, value, memory location, or the like. For example, an object can be hosted in a device (e.g., user equipment (UE), ZigBee sensor, or the like) or in an M2M server (e.g., application server (AS), services capability server (SCS), or the like).

It will be understood that the system 100 depicted in FIG. 1 may map to the 3GPP evolved packet core (EPC) such that embodiments described herein can be implemented in accordance with 3GPP EPC. For example, the reference point 112 of FIG. 1 may map to the Rx reference point in 3GPP EPC. The south edge routers 108 may be implemented in nodes such as an eNodeB, a serving gateway (S-GW), and an evolved packet data gateway (ePDG). The north edge routers 110 may be implemented in nodes such as a packet data network (PDN) gateway (P-GW) and a traffic detection function (TDF). The control plane nodes 114 may include various nodes such as, for example, a policy and charging rules function (PCRF), TDF, machine-type communications (MTC) inter-working function (MTC-IWF), policy and charging enforcement function (PCEF), mobile management entity (MME), eNodeB, S-GW, and P-GW. It will be understood that some of the above nodes may implement the data plane nodes 106 and the control plane nodes 114.

Figure 2:
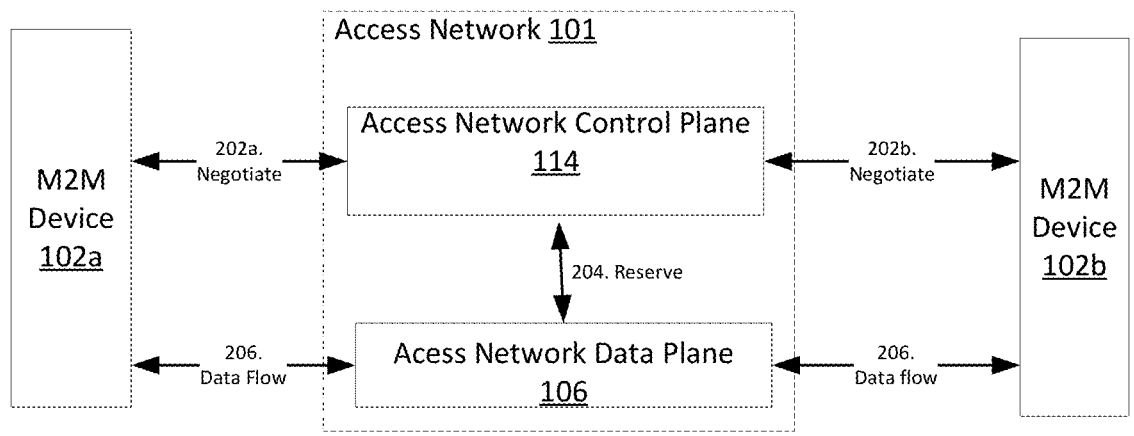
FIG. 2 is a system diagram that depicts an example of quality of service (QoS) resource reservation.

FIG. 2 shows a portion of the system 100 that includes the plurality of M2M devices 102, for instance a first M2M device 102a and a second M2M device 102b. For convenience, the same or equivalent elements in the various embodiments illustrated in the drawings have been identified with the same reference numerals. An example of QoS resource reservation is depicted in FIG. 2 in accordance with one embodiment. Referring to FIG. 2, in accordance with the illustrated embodiment, at least one, for instance both, of the first and second M2M devices 102a and 102b may request that data plane resources be dedicated to the M2M devices 102a and 102b for communicating with each other. For example, at 202a, the first M2M device 102a may send a request message to the control plane 114. The request message may request dedicated data plane resources for communicating with the second device 102b. Alternatively, or additionally, at 202b, the second M2M device 102b may request dedicated data plane resources for communicating with the first device 102a. At 204, in accordance with the illustrated embodiment, the control plane 114 reserves the requested resources for the first and second M2M devices 102a and 102b. At 206, the M2M devices 102a and 102b may communicate with each other using the reserved resources.

Figure 3:
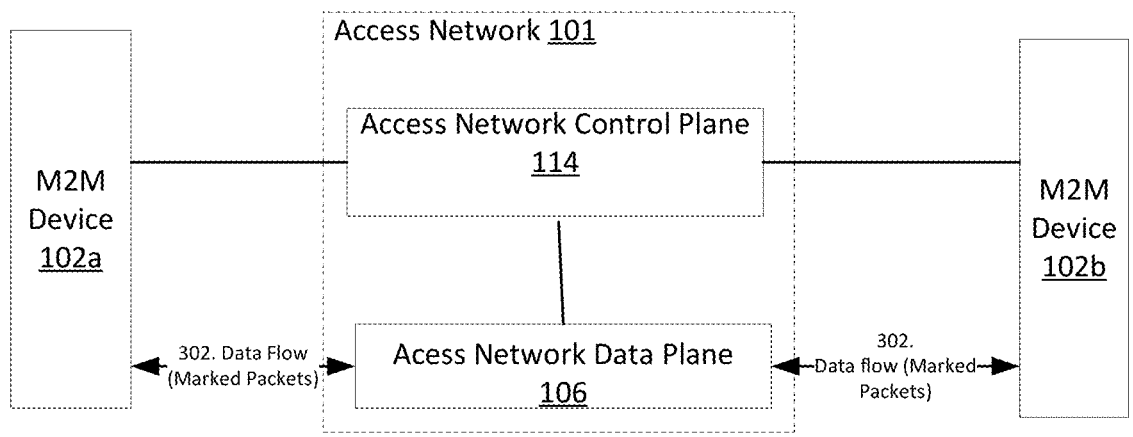
FIG. 3 is a system diagram that depicts an example of QoS packet marking.

FIG. 3 depicts an example of QoS packet marking in accordance with one embodiment. Referring to FIG. 3, in accordance with the illustrated example, neither of the first and second M2M devices 102a and 102b uses the control plane interface 112 to reserve network resources. Instead, for example, the first and second M2M devices 102a and 102b may mark data plane packets with an indication of what kind of QoS treatment is required by each of the devices 102a and 102b. The access network routers 108 and 110 can parse the packet markings to detect the QoS requirements of the packets. Thus, in accordance with the illustrated example, at 302, the first and second devices 102a and 102b communicate with each other using packets that include packet markings indicated of various QoS requirements.

Table 1 (below) shows a comparison of example QoS approaches depicted in FIGS. 1 and 2. The example advantages and disadvantage columns in Table 1 refer to advantages and disadvantages of one example implementation of the respective QoS approaches.

TABLE 1

| QoS Approach | Example Advantages | Example Disadvantages |
| --- | --- | --- |
| Resource Reservation (e.g., FIG. 2) | Data plane resources can be dedicated to the flow. Thus, QoS may be guaranteed. | May require an interface to the access network's control plane.<br>May require additional signaling on the control plane.<br>May require admission control.<br>May require specific knowledge of the access network.<br>May be complicated in implementations in which the packets are routed through multiple access networks. |
| Packet Marking (e.g., FIG. 3) | May require no interface to the access network's control plane.<br>May require no specific knowledge of the access network (e.g., access network agnostic).<br>May work well in implementations in which the packets are routed through several access networks. | May provide limited means for the access network to guarantee that the resources will be available for the duration of the flow.<br>Treatment decisions may be made on a packet-by-packet basis.<br>May require that the access network(s) knows how to interpret the markings. |

The Internet Engineering Task Force (IETF) has defined two approaches to providing QoS in IP networks: Integrated Services (IntServ) and Differentiated Services (DiffServ). Integrated Services (IntServ) follows at least a portion of the example resource reservation approach described above in that the end-hosts signal their strict QoS needs to the network and reserve resources. DiffServ implements packet marking without resource reservation, in that network elements are set up to service multiple classes of traffic with varying and coarse QoS requirements based on packet marking.

In the 3GPP EPC/IMS, QoS is defined by various parameters, such as, for example, Priority (e.g., 1-9), Delay Budget (e.g., 100 ms-300 ms), Packet Loss Rate (e.g., 10-2 to 10-6), Guaranteed Bit Rate (GBR) or non-GBR, and Required Bit Rate (if GBR). The 3GPP EPC/IMS follows the signaled QoS model where one or both of the flow endpoints can request data plane resources from the network. 3GPP provides the receive (Rx) reference point to Application Functions, such as an Services Capability Server (SCS) or an IP multimedia subsystem (IMS) call session control function (CSCF), to provision QoS rules on a per flow basis. A flow is generally described in terms of the end point's transport addresses. 3GPP allows UEs to make control plane requests, such as "Resource Bearer Activation" and "Resource Bearer Modification," for data plane resources.

In release 10, 3GPP added the ability to configure UEs as "low priority". During times of congestion, session management and mobility management requests from low priority user equipments (UEs) can be rejected by the core network. The rejection message may include a back off time.

The rejection can also be based on the access point name (APN) that is associated with the session management (SM) or mobility management (MM) request. Further, in release 10, 3GPP introduced extended access baring (EAB). In EAB, the network can broadcast a message that bars certain groups of UEs from originating signaling.

The "low priority" and EAB features are not traditional QoS mechanisms, but may be considered QoS mechanisms in accordance with the descriptions of various embodiments described herein. For example, such features may be referred to as QoS mechanisms in that they give a lower priority to traffic that originates from a certain UE or a certain group of UEs.

In an example embodiment, an M2M architecture, such as the M2M system 100 for example, provides various QoS mechanisms. Various embodiments described herein refer to the system 100 for convenience. It will be appreciated that the example system 100 is simplified to facilitate description of the disclosed subject matter and is not intended to limit the scope of this disclosure. Other devices, systems, and configurations may be used to implement the embodiments disclosed herein in addition to, or instead of, a system such as the system 100, and all such embodiments are contemplated as within the scope of the present disclosure. Referring to FIG. 1, the M2M system 100 includes the service layer 104 that may include at least one M2M server that has a business relationship with an operator of the access network 101, which can be referred to as the access network operator. The business relationship may mean that the owner of the M2M server has an agreement with the access network operator that allows the M2M server to interface to (communicate with) the access network 101. For example, the access network 101 may allow the M2M server to sends policies to a PCRF that is within the access network 101. The at least one M2M server may include a southbound interface that can be used for resource reservation. In some cases, it may be assumed that the network applications 116 have no business relationship with the access network operator. As used herein, the aforementioned southbound interface may refer to a logical interface or reference point, such as within an M2M server, application server, service layer, service capability server, application function, or the like for example, that can exchange information with nodes within the access network 101, which can be referred to collectively as access network nodes. Such access network nodes may include, presented by way of example and without limitation, a PCRF, MTC-IWF, or the like.

In some example cases, the network applications 116 do not have a business relationship with each other, and the network applications 116 communicate with the M2M devices 102 via one or more M2M servers that reside within the service layer 104. Thus, the network applications 116 may rely on at least one M2M server to communicate with the M2M devices 102. Still referring to the above example, because the network applications 116 do not have a business relationship with each other, their actions might not be coordinated with each other, but the network applications 116 may be connecting to, and communicating with, the same ones of the M2M devices 102.

Table 2 depicts relationships between the various entities depicted in FIG. 1 that are assumed in accordance with a one embodiment.

TABLE 2

| Actor | Network App. | M2M Server | Access Network | Devices |
|---|---|---|---|---|
| Network App. | None | Business | None | Business or Ownership |
| M2M Server | Business | | Business | None, Business, or Ownership |
| Access Network | None | Business | | Business |
| Devices | None, Business, or Ownership | None, Business, or Ownership | Business | |

As described above, resource reservation may be used for IP flows that are associated with streaming media such as, for example, video, audio, or the like. In an example M2M system, such as the M2M system 100 for example, the number of M2M devices 102 that are connected to the network 101 may be several orders of magnitude greater than what is connected to broadband and mobile networks. The IP flows that exist between the M2M devices 102 and an M2M Server may be numerous. Thus, in accordance with various example embodiments described herein, the IP flows that exist between M2M devices 102 and M2M servers are characterized differently than IP flows that are associated with traditional streaming media applications.

It is recognized herein that existing resource reservation techniques are inefficient for M2M communications. For example, existing techniques do not account for the fact that some M2M flows can be delayed for relatively long periods of time without impacting the user experience. By way of further example, it is often inefficient to characterize individual data flows that travel to and from M2M devices. Rather, it can be more efficient to characterize some data flows as a group, as described further below in accordance with various embodiments described herein. It is further recognized herein that existing resource reservation techniques might not allow resources to be reserved and shared between IP flows that belong to entities that have no relationship with each other. Such entities may be referred to as unrelated entities. For example, unrelated entities might not be able to coordinate their traffic with each other as QoS is often used by streaming media applications that cannot be delayed until a later time. In an example embodiment, the service layer 104 coordinates (groups) activities of the network applications 116 that have no relationship with each other.

By way of further example, it is recognized herein that existing QoS mechanisms often do not allow applications or services to efficiently reserve network resources for infrequent transmissions that need to be sent with short delay. For example, existing resource reservation techniques, such as those provided by 3GPP, allow applications or services to configure how much delay a flow can incur. This approach requires that the QoS requirements be set up and reserved before the flow starts. In an example implementation of existing 3GPP resource reservation, a user may initially experience a large delay before a voice call starts. Thus, the 3GPP resource reservation approach may not be suitable for various scenarios such as, for example, a scenario in which a sensor is required to immediately send a shutdown command to a transformer that is deployed on a power line.

Figure 4:
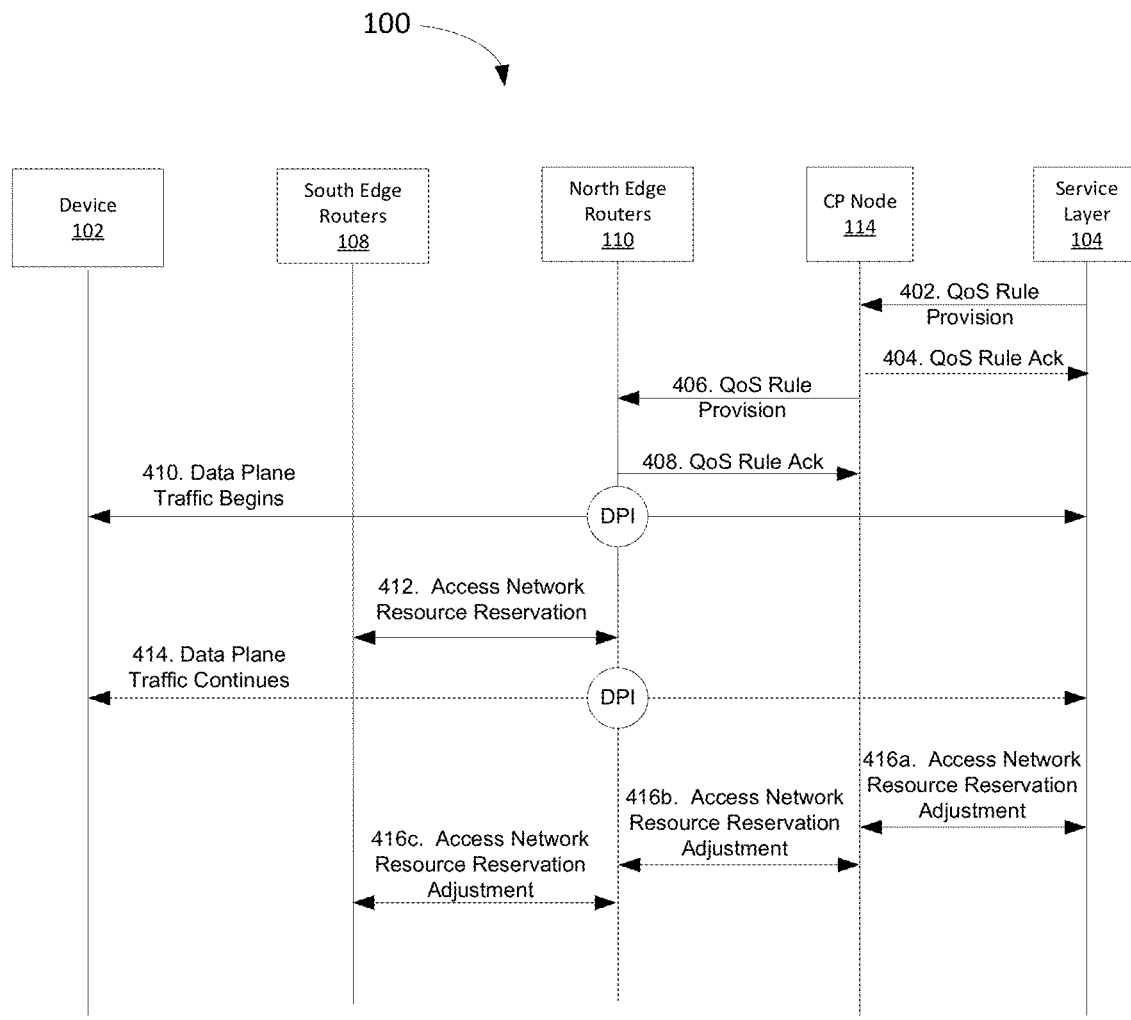
FIG. 4 is a call flow for configuring QoS by a service layer in accordance with an example embodiment.

FIG. 4 is a call for configuring QoS by a service layer, such as the service layer 104 of the example M2M system 100, in accordance with an example embodiment. Referring to FIG. 4, M2M traffic is characterized at the service layer 104, rather than characterizing service layer traffic based on delay, bit rate, or the like. In accordance with the illustrated embodiment, the service layer 104 stores information in objects. The service layer 104 may use the control plane interface 112 with the access network 101, which can be used to configure QoS policies that are based on the object that is being addressed.

With continuing reference to FIG. 4, the illustrated call flow demonstrates an example of how QoS can be configured by the service layer 104 based on object names and how the access network 101 can apply the QoS policies. In accordance with the illustrated embodiment, at 402, the service layer 102 sends a QoS configuration message to one of the access network control plane nodes 114, for instance a CP node 114. The message may include various parameters, such as those parameters identified in Table 3 below for example. Thus, the QoS configuration message may include at least one new QoS rule. It will be understood that the QoS configuration message can include other parameters as desired.

TABLE 3

| Parameter | Description |
| --- | --- |
| Service Layer ID | Identifies the Service Layer. The format of this identifier may be a URI. |
| Permitted for R/W Access | A list of devices, application, or service layers that are permitted to make read and write requests to the Object ID. This field may be used by the access network to perform access control and avoid the case where a device, which is not permitted to access the Object ID, addresses the Object ID and causes resources to be reserved. |
| Permitted for Read Access | A list of devices, application, or service layers that are permitted to make read requests to the Object ID. This field may be used by the access network to perform access control and avoid the case where a device, which is not permitted to access the Object ID, addresses the Object ID and causes resources to be reserved. |
| Object ID | Identifies the object(s) that this rule applies to. The format of this identifier may be a URI. |
| Read Response Cache Time | When the Object is read, the read response may be cached by a network node, such as the North Edge router, for this amount of time. |
| Delay Tolerance | When the Object is accessed, the message is required to be delivered in an amount of time indicated by this delay tolerance parameter.<br>This value may be used by the access network to select what data pipe (tunnel) should be used to deliver the message.<br>This value may be used by the access network to determine how to configure a data pipe (tunnel) that may be used to deliver the data.<br>This value may be used by the access network to determine what QoS markings should be applied to the read response packet(s). |
| Reject During Congestion | This parameter may indicate to the access network that the request can be rejected by the access network, on behalf of the service layer, during periods of congestion.<br>This parameter may further indicate to the access network how long the access attempt can be rejected before impacting user experience. If an acceptable reject duration is included in this message, then this value may be used to derive a back off time that may be included in the reject message. |
| Rule Duration | When an event causes this rule to be applied, this parameter may be used to determine how long the rule should remain in effect.<br>Examples of events that may cause the rule to be applied include, without limitation, a device or SCS accessing the object, or the device or SCS sending a message to an access network node requesting that the rule be activated. |
| Reservation Failure Action | This parameter may indicate to the access network what action should be taken if the required resources cannot be reserved when the rule needs to be enacted. If the required resources cannot be enacted, this parameter may indicate that the traffic should be rejected and delayed to another time or that best effort delivery should be attempted. |
| Preferred Route | This parameters may indicate the preferred route, or hops, that the flow should take through the access network. If the flow requires a short delay, the preferred route may require that certain high speed routers are used or the route may be optimized to decrease the number of hops.<br>Alternatively, this parameter may specify what type of routes should be used instead of specifying specific routers. By way of example, it may specify that only high speed routers be used. |

Still referring to FIG. 4, in accordance with the illustrated embodiment, at 404, the CP Node 114 may send an acknowledgement of the new QoS rule to the service layer 104, and in particular to an SCS. If the request failed for QoS configuration fails, the message that is sent at 404 may indicate a cause of the failure. At 406, in accordance with the illustrated embodiment, the CP Node 114 passes the QoS rule to ones of the data plane routers 108 and 110 that may be used to access the Object that is identified in the QoS rule (e.g., shown in Table 3). For example, the message at 406 may be sent to at least one, for example all, of the routers 108 and 110 in the access network 101. By way of further example, the message that includes the at least one QoS rule may be sent to a subset of the routers 110 by the CP node 114, and then disseminated to the other routers 108 by the north edge routers 110. Based on the QoS rule, the CP node 114 may determine the route that the flow should take through the network 101. In an example, the CP Node 114 configures the other control plane nodes 114 and the data plane nodes 106 to apply a specific label packet marking) to at least some, for instance all, packets that are associated with a particular object. In some cases, after the packets are marked, deep packet inspection (DPI) may not need to be performed on the marked packets. The marking (label) may indicate how the packet should be handled (processed).

Still referring to FIG. 4, in accordance with the illustrated embodiment, at 408, one or more routers, for instance the north edge routers 110, router may send an acknowledgement to the node 114 that sent the rule. At some time after the acknowledgements are sent, at least one of the north edge routers 110 may use deep packet inspection to recognize that the Object that was identified in the rule (e.g., Table 3) is being accessed. Step 410 is illustrated as bidirectional to show that this initial access may be initiated by the device 102 or the service layer 104. While the illustrated embodiment shows the north edge router 110 performing DPI, it will be understood that the DPI may be performed by at least one of the south edge routers 108 or any other data plane router that was configured with the QoS rule. By way of example, the QoS rule may dictate that the flow goes through a different route through the network 101. By way of further example, the QoS rule may indicate that the flow should go through a particular north edge router, for instance a north edge router that can route data with a lower latency as compared to the other routers in the network. Thus, for example, the particular north edge router may inform the other routers where to direct traffic. The flow route, which may also be referred to as the hops, may be included in, and thus may be part of, the QoS rule.

At 412, one of the north edge routers 110 may recognize that downlink resources will need to be reserved for the data flow. The north edge router 110 may send a message to the other data plane routers, for instance the south edge routers 108, in the network 101 to reserve resources for the flow. Step 414 is illustrated as bidirectional to show that the north edge router 110 may request resources from the south edge routers 108, and the south edge routers 108 may acknowledge the request by sending an acknowledgement message to the north edge router 110. Thus, in accordance with the illustrated embodiment, the north edge router 110 informs the other routers in the network 101 of the QoS rule. Alternatively, the CP Node 114 may inform nodes, for instance the routers 108 and 110, of the QoS rule. If resource reservation identified in the QoS rule fails, the north edge router 110 may inform the CP node 114 of the failure, and the CP node 114 may inform the service layer 102, and in particular the SCS, of the failure. At 414, the data flow between the device 102 and the SCS continues in accordance with the one or more configured QoS rules. One or more, for instance all, of the data plane routers 108 and 110 may continue to perform DPI on the flow to apply the QoS rules and to determine how long the QoS rules should be applied. Step 414 is illustrated as bidirectional to show that the flow is bidirectional. At 416a, when the flow ends, expires, or is modified for example, the service layer 104, and in particular the SCS, and the CP node 114 may send notifications to each other to adjust the amount of resources that are reserved for the flow. At 416c, when the flow ends, expires, or is modified for example, the data plane routers 108 and 110 may send notifications to each other to adjust the amount of resources that are reserved for the flow. Step 416c is illustrated as bidirectional to show that, in accordance with an example, the north edge router 110 may send a message to the south edge routers 108 to request that the south edge routers 108 release the network resources, and the south edge routers 108 may send an acknowledgement message to the north edge router 110 to acknowledges the request. Similarly, at 416b, when the flow ends, expires, or is modified for example, the north edge data plane routers 110 and the CP node 114 may send notifications to each other to adjust the amount of resources that are reserved for the flow. Alternatively, or additionally, at the messages at 416a-c may be initiated by a congestion situation in the network. For example, congestion may cause the network 101 to decrease the amount of resources that are reserved for the flow. By way of example, a flow may be "modified" when a different object is accessed.

Figure 6A:
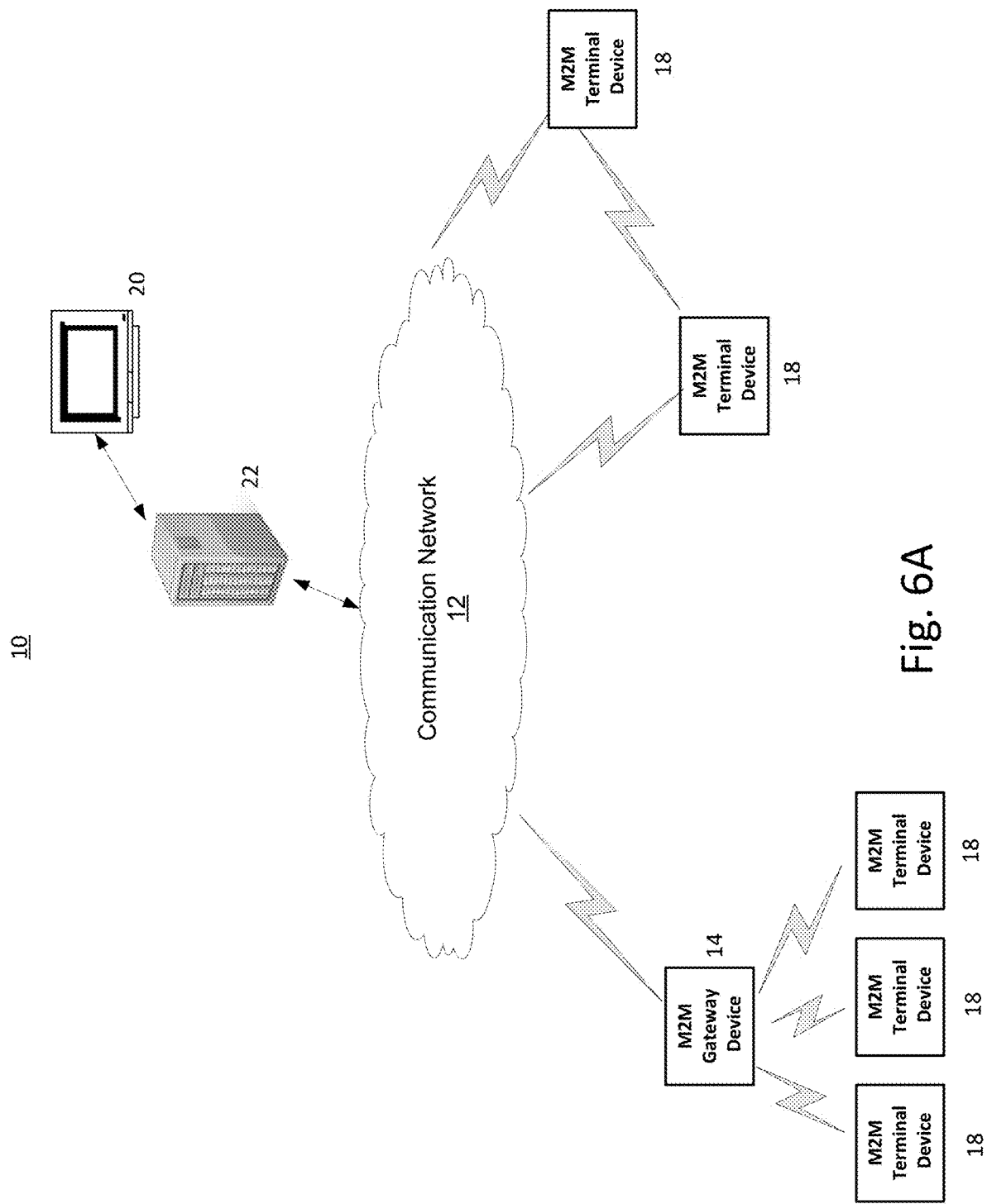
FIG. 6A is a system diagram of an example machine-to-machine (M2M) or Internet of Things (IoT) communication system in which one or more disclosed embodiments may be implemented.
Figure 6B:
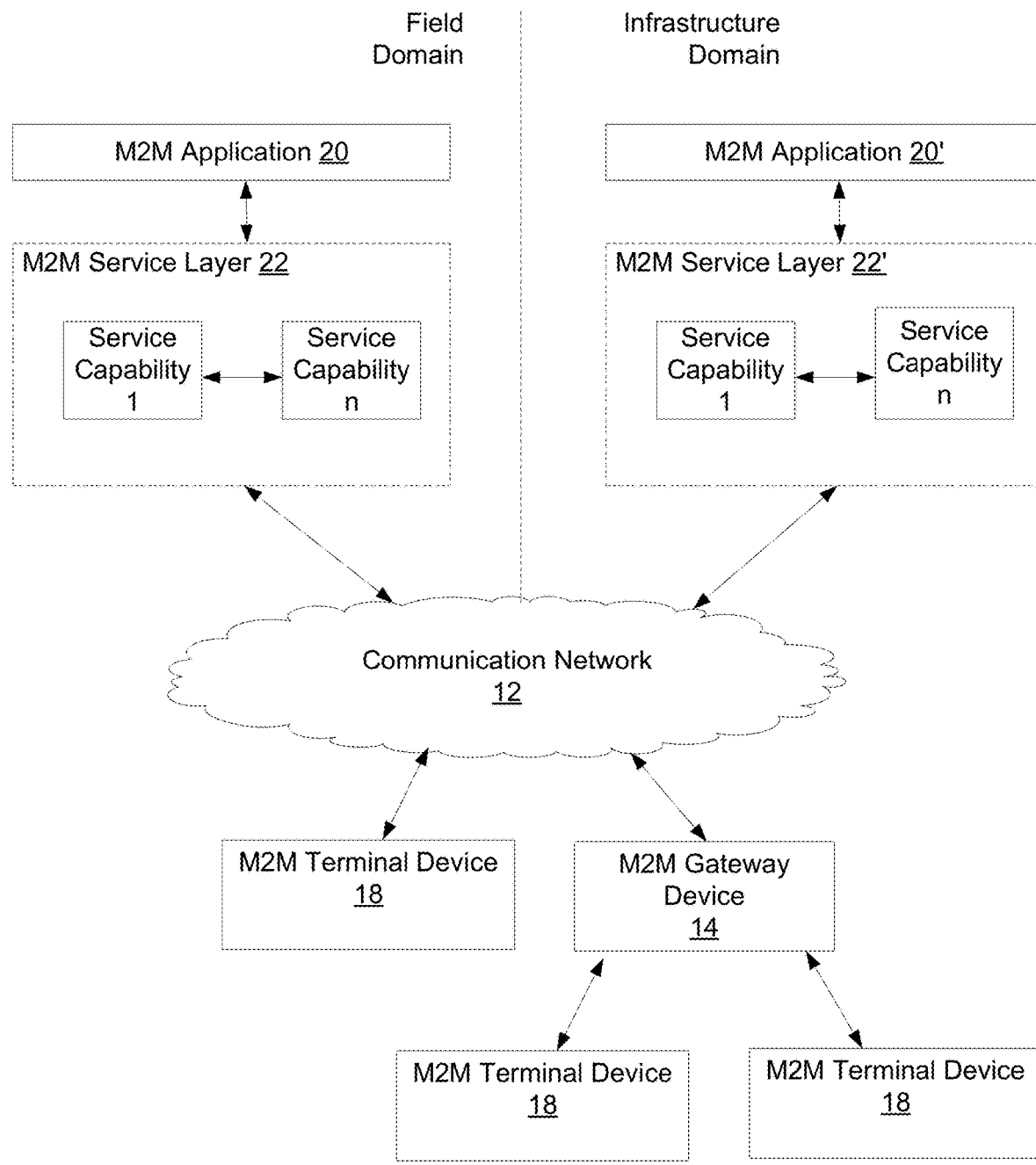
FIG. 6B is a system diagram of an example architecture that may be used within the M2M/IoT communications system illustrated in FIG. 6A.
Figure 6C:
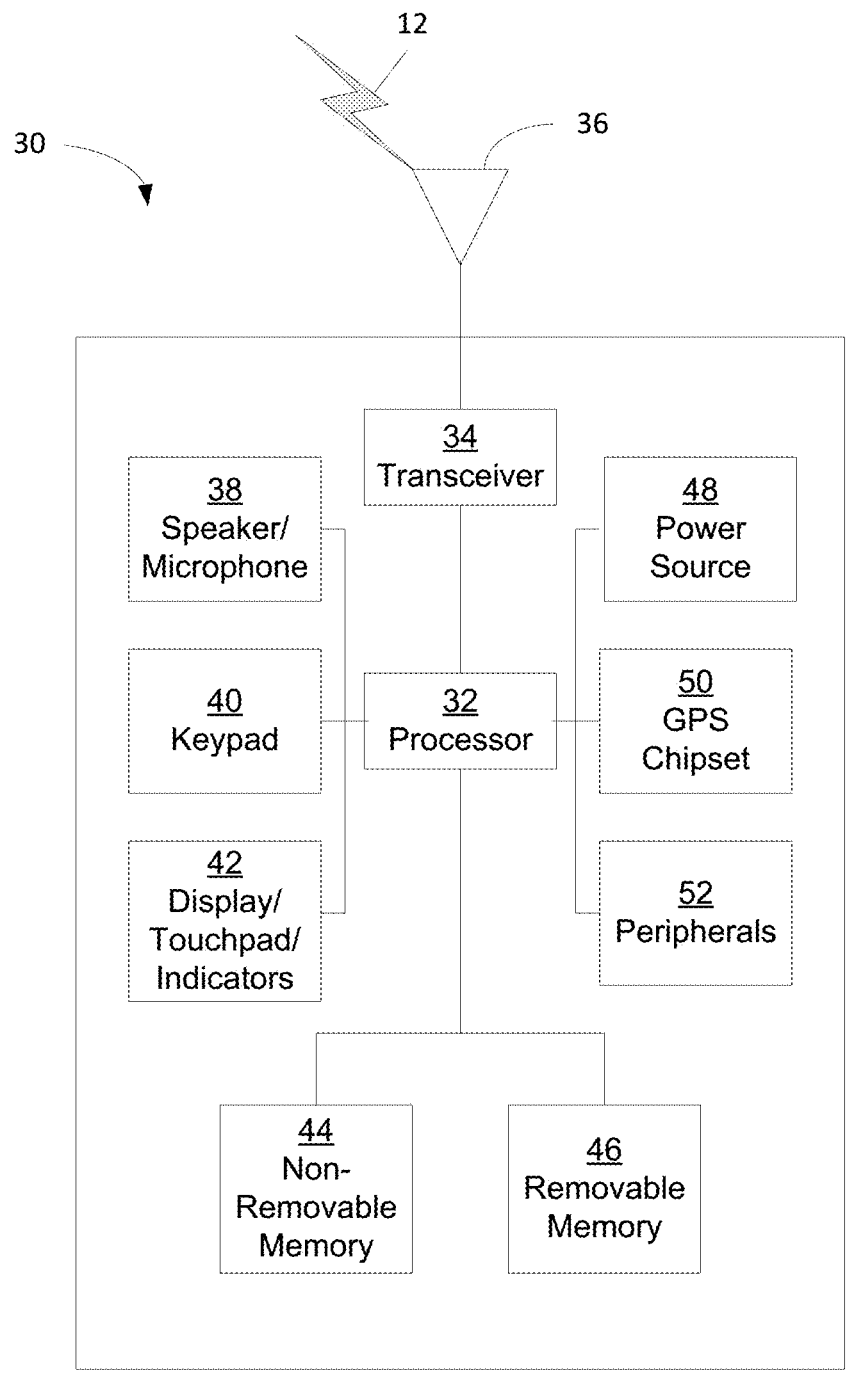
FIG. 6C is a system diagram of an example M2M/IoT terminal or gateway device that may be used within the communications system illustrated in FIG. 6A.
Figure 6D:
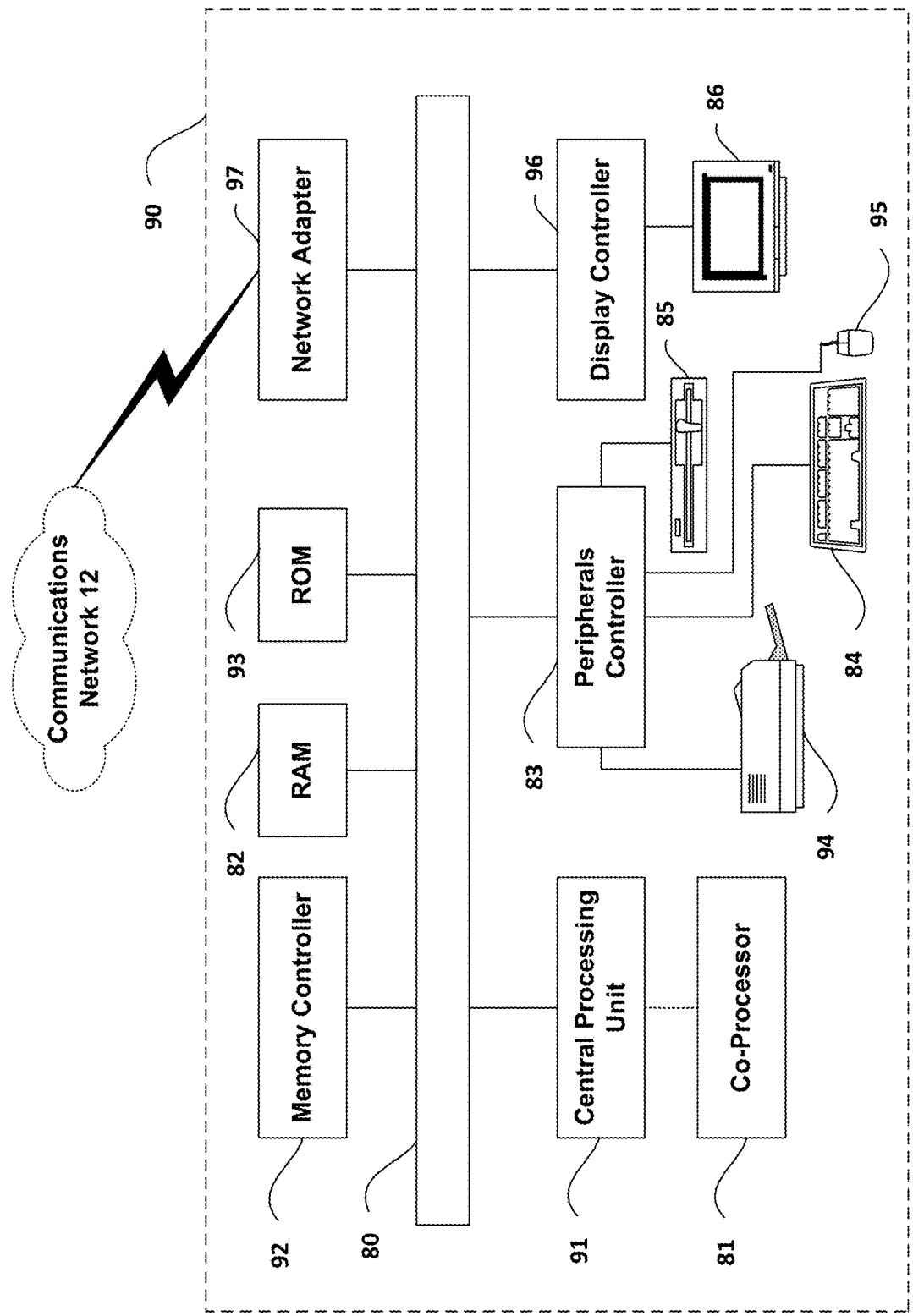
FIG. 6D is a block diagram of an example computing system in which aspects of the communication system of FIG. 6A may be embodied.

It is understood that the entities performing the steps illustrated in FIG. 4 are logical entities that may be implemented in the form of software (e.g., computer-executable instructions) stored in a memory of, and executing on a processor of, a device, server, or computer system such as those illustrated in FIGS. 6C and 6D. That is, the methods illustrated in FIG. 4 may implemented in the form of software (e.g., computer-executable instructions) stored in a memory of a computing device, such as the device or computer system illustrated in FIG. 6C or 6D, which computer-executable instructions, when executed by a process of the computing device, perform the steps illustrated in FIG. 4. In particular, for example, the control plane node 114 in the access network 101 may comprise a processor and a memory, the memory containing computer-executable instructions that when executed by the processor, cause the processor to perform operations comprising receiving a quality of service (QoS) rule associated with an object such that the QoS rule is applied when the object is identified. Based on the QoS rule, the control plane node 114 may determine a route that a message associated with the object should take through the access network 101. Further, the control plane node 114 may direct other control plane nodes to mark packets associated with the object with a label, wherein the label is indicative of the determined route. In one embodiment, based on the QoS rule, the control plane node 114 provisions at least one of the routers 110 in the access network 101 with the QoS rule such that the at least one router 110 applies the QoS rule when the object is identified. In another embodiment, the control plane node 114, based on the QoS rule, provisioning all routers 108 and 110 in the access network 101 with the QoS rule such that all of the routers 108 and 110 in the access network 101 apply the QoS rule when the object is identified. The object may be at least one of an internet protocol (IP) address, port number, resource name, or memory location.

By way of further example, at least one node that resides within the service layer 104, such as a service layer server for example, may comprise a processor and a memory, the memory containing computer-executable instructions that when executed by the processor, cause the processor to perform operations comprising (at 402) provisioning a quality of service (QoS) rule via the control plane interface 112, the QoS rule associated with an object such that the QoS rule is applied when the object is identified. As described above, the QoS rule associated with the object may indicate a route that a message associated with the object should be directed through the access network 101. Alternatively, or additionally, the QoS rule may indicate a maximum aggregate bit rate associated with a group of devices 102 that communicate with the services capability server via the access network 101. In one embodiment, as further described below, the service layer server is a services capability server (SCS) and the control plane node 114 is a policy and charging rules function (PCRF). In such an embodiment, the QoS rule may be provisioned directly from the services capability server to the PCRF over a diameter-based Rx interface. Alternatively, in the aforementioned embodiment, the QoS rule may be provisioned indirectly from the services capability server to the PCRF via a machine-type communications inter-working function (MTC-IWF).

Thus, referring to FIG. 4, at 414, the routers 108 and 110, such as one of the routers 110 for example, may comprise a processor and a memory, the memory containing computer-executable instructions that when executed by the processor, cause the processor to perform operations comprising receiving a message indicative of an object. The operations may further comprising performing a deep packet inspection on the message and identifying the object indicated by the message during the deep packet inspection. In response to identifying the object, the router may apply a quality of service (QoS) rule to the message. As described above, the object may indicate a destination of the message. The destination may be at least one of an internet protocol (IP) address, port number, resource name, or memory location. Applying the QoS rule may include, in accordance with an example, determining that the access network 101 is in a congestion condition, and based on the congestion condition, rejecting the message for a backoff time indicated in the QoS rule (see, e.g., Table 3). In some cases, the router may apply the QoS rule and route the message through a preferred route of the access network 101, wherein the preferred route is indicated by the QoS rule (see, e.g., Table 3). As described with reference to 402 and 406, the router may receive the QoS rule from a service layer server that resides in the service layer 104, via the control plane node 114 of the access network 101. The router may send the QoS rule to other routers within the access network 101.

Still referring generally to FIG. 4, in accordance with the illustrated embodiment, one or more QoS rules are provisioned in the access network 101 for future use. A QoS rule may be applied when the access network 101 detects some event, such as access of a particular object for example, that causes the rule to be enacted. The QoS rules may be pre-provisioned and applied throughout the access network 101 when the flow is detected. Thus, in some cases, the example embodiment may provide a benefit in that neither the devices 102 nor the service layer 104 are required to configure a particular flow before it starts.

During periods of congestion, the access network 101 can use the delay tolerance parameters to determine which flows need to be terminated, reduced, delayed, or disallowed. For example, when congestion is first detected, resources that are reserved for flows with a high delay tolerance can be reduced, completely terminated, delayed, or told to back-off. For example, the back-off time may be based on the flow's delay tolerance.

In an example embodiment, when QoS rules are applied to a flow, details of the QoS rules may be captured in charging records that are associated with a flow. For example, if a flow is assigned a delay value or flagged as acceptable to reject during congestion, then this information may be captured in the associated charging data records (CDRs). By way of a further example, if a customer elects to flag a flow as one that is rejected during congestion, then the customer may be charged less than what the customer would be charged for a higher priority flow.

Figure 5:
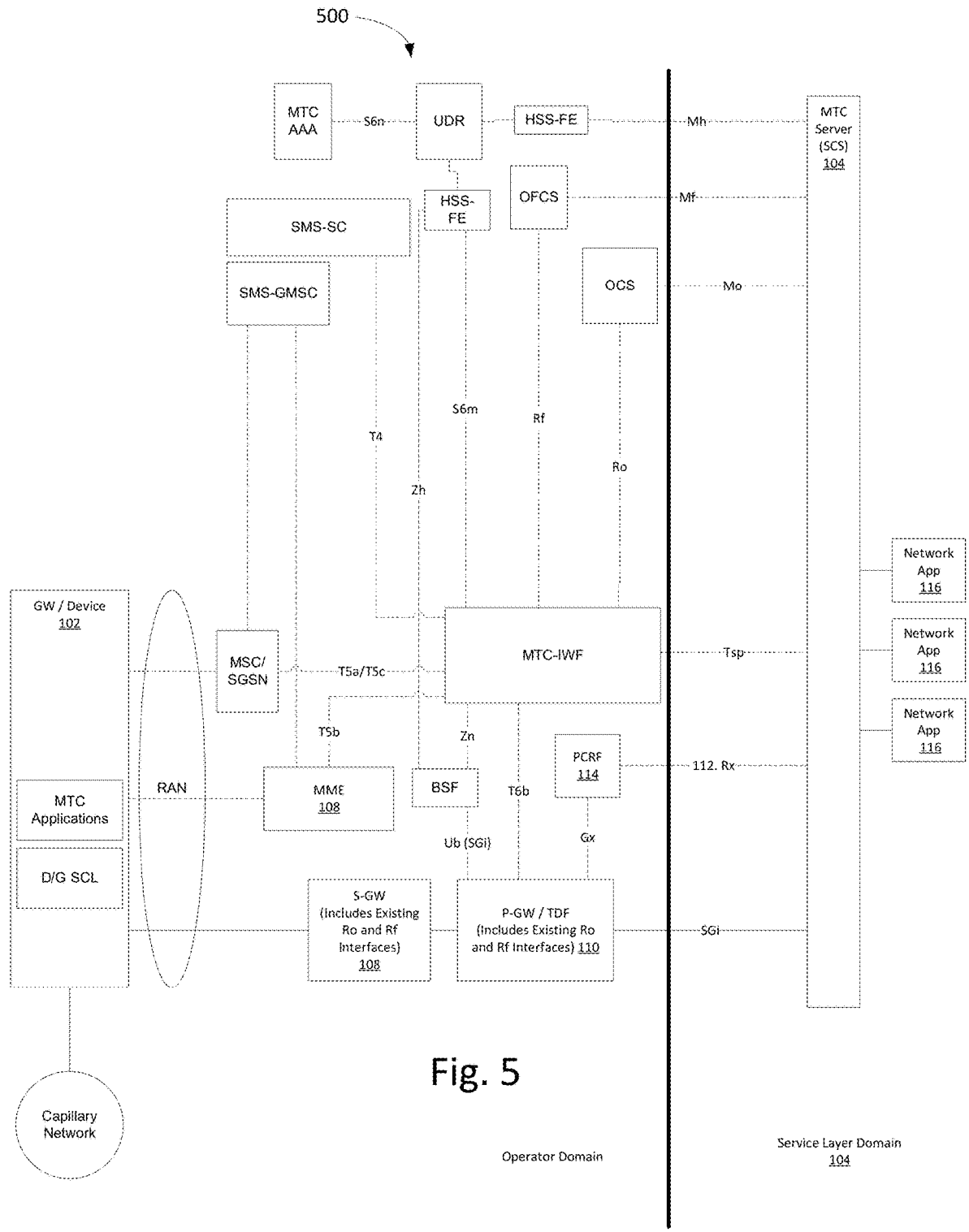
FIG. 5 is a system diagram of a 3GPP evolved packet core (EPC) Architecture with interfaces to a services capability server (SCS) in accordance with an example embodiment.

FIG. 5 is a system diagram of an 3GPP EPC Architecture 500 that includes interfaces to an SCS in accordance with an example embodiment. In this example architecture, the interface 112 is mapped to (implemented by) the Diameter based Rx interface, the CP Node 114 is mapped to (implemented by) the PCRF, the North Edge router 110 is mapped to (implemented by) the P-GW and TDF, and the South Edge routers 108 are mapped to (implemented by) the S-GW, MME, and eNodeB.

Referring to FIG. 5, the TDF may be an entity that performs DPI and detects that a QoS rule should be applied. When the TDF detects that a QoS rule should be applied, for example, a message may be sent to the P-GW that will cause it to activate or modify a bearer so that the proper QoS can be provided.

Information about the flow may also be disseminated to the P-GW, S-GW, and MME so that, for example, these nodes can use the flow information to make decisions about what flows should be subject to back off control during times of congestion. Various Nodes such as the S-GW, MME, eNodeB, and P-GW for example, may be used to detect congestion situations in the network and then cause the amount of resources that are dedicated to delay tolerable flows to be reduced.

In an example embodiment, the TDF may provide the P-GW with a list of service data flows (SDFs) that may be reduced. For example, the P-GW may use the "Bearer Modification Procedure with Bearer QoS Update" referenced below to reduce the amount of resources that are reserved for the bearers that carry the selected flows. Alternatively, the P-GW may use the "PDN GW Initiated Bearer Deactivation" procedure referenced below to deactivate the bearers that are reserved for the bearers that carry the selected flows. When the bearer is deactivated or modified, the UE may be provided with a back off time that it must observe before attempting to modify or activate a bearer. The "Bearer Modification Procedure with Bearer QoS Update" and "PDN GW Initiated Bearer Deactivation" procedures are further described in 3GPP TS 23.401 General Packet Radio Service (GPRS) enhancements for Evolved Universal Terrestrial Radio Access Network (E-UTRAN) access, which is incorporated by reference as if set forth in its entirety herein.

In another example embodiment, QoS rules may be provisioned in the UDR by the SCS. The PCRF may retrieve the rules from the UDR. In yet another example embodiment, the interface 112 may be routed through the MTC-IWF and to the PCRF via the Tsp and T6b interfaces. Thus, QoS rules may be provisioned indirectly from the services capability server to the PCRF via a machine-type communications (MTC) inter-working function (IWF). Alternatively, in accordance with another embodiment, the interface 112 may be routed through the MTC-IWF via the Tsp interface.

The example QoS parameters that are listed in Table 3 and Table 4, and traditional QoS parameters such as, for example, bit rate, bit error rate, and the like, combine to result in a large number of potential QoS configurations. Thus, in an example embodiment, network operators may choose to limit the number of parameter combinations that can be selected. Table 4 illustrates one example of how an access network operator may choose to limit the number of possible QoS configurations. It will be understood that QoS configurations can be unlimited or alternatively combined as desired.

TABLE 4

Example QoS Classes

| Parameter | Class 1 | Class 2 | Class 3 | Class 4 | Class 5 |
|---|---|---|---|---|---|
| R/W Access | R/W | R/W | R/W | R/W | R/W |
| Read Response Cache Time | 1 s | 10 s | 300 s | 1800 s | 43,200 s |
| Delay Tolerance | 100 ms | 200 ms | 300 ms | 400 ms | 500 ms |
| Reject During Congestion | Yes/No | Yes/No | Yes/No | Yes/No | Yes/No |
| Reservation Failure Action | Best Effort | Best Effort | Best Effort | Reject | Reject |
| Packet Loss Rate | $10^{-2}$ | $10^{-3}$ | $10^{-4}$ | $10^{-5}$ | $10^{-6}$ |

In accordance with an example embodiment, service layer deployments may connect with devices over multiple access networks. For example, some devices may be able to switch their service layer connection between access networks or simultaneously connect to the service layer via more than one access network. In an example embodiment, the service layer is able to command a device to use a particular access network or dictate to the device how its traffic should be partitioned between the access networks. In another example embodiment, the service layer is able to inform the access network of what policies a device should follow when selecting an access network. For example, the access network may then pass the policies to the device via various protocols (e.g., ANSDF).

It will be understood that an SCS may be in control of numerous devices and may know that the aggregate bit rate, or QoS needs, of a particular group of devices may not exceed a certain threshold. For example, suppose an SCS has control of a group of 100 devices. The SCS may know that each individual device will not require more than 1 Mbps of uplink or downlink bandwidth at a given time, but that the maximum aggregate bit rate across all devices in the group will not exceed 20 Mbps. If the SCS provides the access network with the aggregate bit rate of group, then the access network may be able to more efficiently manage its resources. For example, rather than reserving 100 Mbps of bandwidth, it may reserve 20 Mbps of bandwidth and "virtually" reserve 1 Mbps of bandwidth for each of the 100 devices in the group. By way of further example for purposes of illustration, suppose a scenario in which 99 members of the group are connected, each member is given a "virtual" guarantee of 1 Mbps, and 100% of the access network's data plane bandwidth has been allocated. If the 100th member of the group requests a QoS guarantee of 1 Mbps, the access network will know to grant the request because aggregate bandwidth demands on the access network are not going to increase. The above scenarios are presented for purpose of illustration, and not limitation.

In accordance with another example embodiment, the call flow depicted in FIG. 4 can be used to make group QoS reservations as described below. Referring to FIG. 4, at 402, the service layer 102, and in particular a SCS of the service layer 102, may send a Group QoS Provisioning message to the CP node 114. The message may include the parameters that are illustrated in Table 3, and the message may further include the message contents that are shown in Table 5 below.

TABLE 5

| Parameter | Description |
|---|---|
| Service Layer ID | Identifies the Service Layer. The format of this identifier may be a URI. |
| Group ID | The name of the QoS Group |
| Group Members | A list that identifies the group members. The individual identifiers may be a URI, IP Address, MSISDN, or IMSI |
| Per Member GBR | The maximum guaranteed bit rate that is required by each device. |
| Group AGBR | The maximum aggregate guaranteed bit rate that is required by this group. |

At 404, in accordance with the group provisioning example, the CP Node 114 acknowledges the new QoS rule(s). At 406, the CP node 114 may pass (send) the QoS rule to the north edge routers 110 that may be used to access the Object that is identified in the QoS rule (e.g., Table 5). This message may be sent to one or more, for instance all, of the routers 108 and 110 in the access network 101. For example, this message may be sent to a subset of the routers by the CP node 114, and then disseminated to the other routers by the north edge routers 110. At 408, each router may send an acknowledgement to the node 114 that sent the rule. At 410, as described above, the north edge router 110 may perform deep packet inspection to recognize that the Object that was identified in the rule (e.g., Table 3) is being accessed. The CP Node 114 checks (determines) whether the GBR that is required by the device 102 can be supported. In making this determination, the CP Node 114 may take into account that device 102 is part of a group, and thus that the data plane bearers that are required by the device may not contribute to the aggregate bandwidth that will need to be provided by the network 101. Alternatively, a control plane request from the SCS may initiate the request for data plane bearers to the device 102. While the illustrated embodiment shown in FIG. 4 shows the North Edge router 110 performing DPI, it will be understood that this can alternatively be performed by a South Edge router or any other data plane router that was configured with the QoS rule. At 412, in accordance with the illustrated example, the North Edge router 110 recognizes that downlink resources will need to be reserved for the data flow. A message is sent to the other data plane routers in the network 101 to reserve resources for the flow. At 414, the data flow between the device 102 and the service layer 104, and in particular the SCS within the service layer 104, continues. At least one, for instance all, of the data plane routers 108 and 110 may continue to perform DPI on the flow to apply the QoS rules and to determine how long the QoS rules should be applied. At 416c, when the flow ends, expires, or is modified for example, the data plane routers 108 and 110 may send notifications to each other to adjust the amount of resources that are reserved for the flow. Alternatively, or additionally, steps 416a-c may be initiated in response to a congestion situation in the network 101. For example, congestion may cause the network 101 to decrease the amount of resources that are reserved for the flow.

It will be understood that the actors that perform the call flow of FIG. 4 can be mapped to the 3GPP EPC as described above. For example, FIG. 4, at 410, shows the data plane router 110 using DPI to detect that a flow has started. In an example 3GPP EPC network, the TDF may be the node that performs this DPI step. Alternatively, the data plane resources may be explicitly requested by a UE in a Data Bearer Modification message.

FIG. 6A is a diagram of an example machine-to machine (M2M), Internet of Things (IoT), or Web of Things (WoT) communication system 10 in which one or more disclosed embodiments may be implemented. For example, the system and methods described with reference to FIGS. 2-5 may be implemented on various devices depicted in FIG. 6A, as described further below. Generally, M2M technologies provide building blocks for the IoT/WoT, and any M2M device, gateway or service platform may be a component of the IoT/WoT as well as an IoT/WoT service layer, etc.

As shown in FIG. 6A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks, for instance the access network 101, that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 6A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. The gateway devices 14 or the terminal devices 18 may be configured as the devices 102 in a system that performs QoS provisioning in accordance with the embodiments described above. Each of the M2M gateway devices 14 and M2M terminal devices 18 are configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoW-PAN, Bluetooth), direct radio link, and wireline for example. The terminal devices 18 and the gateway devices 14 may communicate via various networks to exchange QoS rules, as described above.

Referring also to FIG. 6C, the illustrated M2M service layer 22 in the field domain provides services for the M2M application 20, M2M gateway devices 14, M2M terminal devices 18 and the communication network 12. It will be understood that the M2M service platform 22 may communicate with any number of M2M applications, M2M gateway devices 14, M2M terminal devices 18, and communication networks 12 as desired. The M2M service layer 22 may be implemented by one or more servers, computers, or the like. The M2M service 22 layer provides service capabilities that apply to the M2M terminal devices 18, the M2M gateway devices 14, and the M2M applications 20. The functions of the M2M service layer 22 may be implemented in a variety of ways, for example as a web server, in the cellular core network, in the cloud, etc. For example, the QoS provisioning described above may be implemented on various servers within the M2M service layer 22.

Similar to the illustrated M2M service layer 22, an M2M service layer 22' resides in the infrastructure domain. The M2M service layer 22' provides services for an M2M application 20' and an underlying communication network 12' in the infrastructure domain. The M2M service layer 22' also provides services for the M2M gateway devices 14 and M2M terminal devices 18 in the field domain. It will be understood that the M2M service layer 22' may communicate with any number of M2M applications, M2M gateway devices, and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring still to FIG. 6B, the M2M service layers 22 and 22' can provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities can free the applications of the burden of implementing these functionalities, thus simplifying application development and reducing cost and time to market. The service layers 22 and 22' also may enable M2M applications 20 and 20' to communicate through various networks 12 and 12' in connection with the services that the service layers 22 and 22' provide.

As used herein, a service layer may refer to a software middleware layer that supports value-added service capabilities through a set of Application Programming Interfaces (APIs) and underlying networking interfaces. Both ETSI M2M and one M2M use a service layer that may implement the MAC/PHY layer functions described herein. ETSI M2M's service layer is referred to as the Service Capability Layer (SCL). Embodiments described herein may be implemented as part of the SCL, wherein the messages may be based on various protocols such as, for example, MQTT or AMQP. The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (e.g., service capabilities). An instantiation of a set of one or more particular types of CSFs is referred to as a Common Services Entity (CSE) which can be hosted on different types of network nodes (e.g. infrastructure node, middle node, application-specific node). Further, provisioning and applying QoS rules as described herein can be implemented as part of an M2M network that uses a Service Oriented Architecture (SOA) and/or a resource-oriented architecture (ROA) to access.

Further, the context managers of the present application can implemented as part of an M2M network that uses a Service Oriented Architecture (SOA) and/or a resource-oriented architecture (ROA) to access services such as the context manager of the present application.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

FIG. 6C is a system diagram of an example M2M device 30, such as an M2M terminal device 18 or an M2M gateway device 14 for example. The M2M device 30 may be configured as one of the router for provisioning QoS rules in accordance with the embodiments described above. As shown in FIG. 6C, the M2M device 30 may include a processor 32, a transceiver 34, a transmit/receive element 36, a speaker/microphone 38, a keypad 40, a display/touchpad/indicators 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. The display/touchpad/indicators 42 may be generally referred to as a user interface in accordance with an example embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 6C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 6C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store and access context information, as described above, from the non-removable memory 44 and/or the removable memory 46 to determine whether there is context information that satisfies a context information request. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 6D is a block diagram of an exemplary computing system 90 on which, for example, the M2M service platform 22 of FIGS. 6A and 6C may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 6A and 6C.

It is understood that any or all of the systems, methods and processes described herein may be embodied in the form of computer executable instructions (i.e., program code) stored on a computer-readable storage medium, which when executed by a machine, such as a computer, server, peer, M2M terminal device, M2M gateway device, or the like, perform and/or effectuate the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims. This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. In a system comprising a service layer server within a service layer, and a control plane node within an access network, a method comprising:
   provisioning, by the service layer server, a quality of service (QoS) rule via a control plane interface between the service layer server and the control plane node, the QoS rule associated with an object such that the QoS rule is applied to a message when the object is identified as being addressed in the message;
   determining, based on the QoS rule, a packet marking; and
   directing, based on the object being identified as addressed by the message, a user plane node to apply the packet marking to a traffic flow that is associated with the message,
   wherein the object is an addressable resource, container, value, or memory location, and the packet marking indicates 1) a delay tolerance of the message and 2) that resources need to be reserved for the traffic flow that includes the message.

2. The method as recited in claim 1, wherein the QoS rule associated with the object indicates a route that the message associated with the object should be directed through the access network.

3. The method as recited in claim 1, wherein the service layer server is a services capability server, and the control plane node is a policy and charging rules function (PCRF).

4. The method as recited claim 3, wherein the QoS rule is provisioned directly from the services capability server to the PCRF over a diameter-based Rx interface.

5. The method as recited in claim 3, wherein the QoS rule is provisioned indirectly from the services capability server to the PCRF via a machine-type communications interworking function.

6. The method as recited in claim 1, wherein the QoS rule indicates a maximum aggregate bit rate associated with a group of devices that communicate with the services capability server via the access network.

7. The method as recited in claim 1, the method further comprising:
provisioning, by the service layer server, the QoS rule such that a charging record is updated when the QoS rule is applied.

8. The method as recited in claim 1, the method further comprising:
provisioning, by the control plane node, the QoS rule in a packet data network gateway or a traffic detection function.

9. A control plane node in an access network, the control plane node comprising a processor and a memory, the memory containing computer-executable instructions that when executed by the processor, cause the processor to perform operations comprising:
receiving a quality of service (QoS) rule associated with an object such that the QoS rule is applied when the object is identified as being addressed in the message;
determining, based on the QoS rule, a packet marking; and
directing, based on the object being identified in a packet that is associated with the object, a user plane node to apply the packet marking to a traffic flow that is associated with the packet,
wherein the object is an addressable resource, container, value, or memory location, and the packet marking indicates 1) a delay tolerance of the packet and 2) that resources need to be reserved for traffic flow that includes the packet.

10. The control plane node as recited in claim 9, wherein the control plane node further comprises computer-executable instructions that when executed by the processor, cause the processor to perform further operations comprising:
directing other nodes to reserve resources for the traffic flow that is associated with the object.

11. The control plane node as recited in claim 9, wherein the control plane node further comprises computer-executable instructions that when executed by the processor, cause the processor to perform further operations comprising:
determining a route that the message associated with the object should take through the access network, such that a charging record is updated when the QoS rule is applied.

12. An apparatus comprising a processor, a memory, and communication circuitry, the apparatus being connected to an access network via its communication circuitry, the apparatus further comprising computer-executable instructions stored in memory of the apparatus which, when executed by the processor of the apparatus, cause the apparatus to perform operations comprising:
provisioning a quality of service (QoS) rule via a control plane interface between the apparatus and a control plane node within an access network, the QoS rule associated with an object such that the QoS rule is applied to a message when the object is identified as being addressed in the message;
determining, based on the QoS rule, a packet marking; and
directing, based on the object being identified as addressed by the message, a user plane node to apply the packet marking to a traffic flow that is associated with the message,
wherein the object is an addressable resource, container, value, or memory location, and the packet marking indicates 1) a delay tolerance of the message and 2) that resources need to be reserved for a traffic flow that includes the message.

13. The apparatus as recited in claim 12, wherein the QoS rule associated with the object indicates a route that the message associated with the object should be directed through the access network.

14. The apparatus as recited in claim 12, wherein the QoS rule indicates a maximum aggregate bit rate associated with a group of devices that communicate with apparatus via the access network.

15. The apparatus as recited in claim 12, wherein the apparatus further comprises computer-executable instructions stored in the memory of the apparatus, which cause the apparatus to perform further operations comprising:
provisioning the QoS rule such that a charging record is updated when the QoS rule is applied.

* * * * *